United States Patent
Sun et al.

(10) Patent No.: US 9,407,168 B2
(45) Date of Patent: Aug. 2, 2016

(54) POWER CONVERTING CIRCUIT

(71) Applicant: Johnson Electric S.A., Murten (CH)

(72) Inventors: Chi Ping Sun, Hong Kong (CN); Fei Xin, Shenzhen (CN); Xiu Wen Yang, Shenzhen (CN); Shing Hin Yeung, Hong Kong (CN); Yun Long Jiang, Shenzhen (CN); Yan Yun Cui, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/555,941

(22) Filed: Nov. 28, 2014

(65) Prior Publication Data

US 2015/0145453 A1     May 28, 2015

(30) Foreign Application Priority Data

Nov. 28, 2013   (CN) .......................... 2013 1 0625830

(51) Int. Cl.
| | |
|---|---|
| *H02P 27/04* | (2016.01) |
| *H02M 7/5387* | (2007.01) |
| *H02M 1/42* | (2007.01) |
| *H02M 1/12* | (2006.01) |
| *H02M 1/44* | (2007.01) |
| *H02M 1/00* | (2006.01) |

(52) U.S. Cl.
CPC .......... *H02M 7/5387* (2013.01); *H02M 1/4225* (2013.01); *H02M 1/12* (2013.01); *H02M 1/44* (2013.01); *H02M 2001/007* (2013.01); *H02M 2001/0064* (2013.01); *Y02B 70/126* (2013.01)

(58) Field of Classification Search
CPC ........... H05B 6/12; H05B 41/16; H02P 27/04

USPC ......... 318/400.01, 400.14, 400.15, 700, 701, 318/721, 722, 800, 801, 705, 779, 727, 799, 318/729, 803, 811, 812, 825, 778, 430, 432, 318/400.26, 400.27, 400.28, 400.29; 363/13, 17, 21.08, 21.14, 21.18, 27, 363/34, 40, 44, 56.02, 58, 71, 81, 84, 95, 363/98, 108, 109, 114, 120, 152, 174, 175
See application file for complete search history.

(56) References Cited

U.S. PATENT DOCUMENTS

| | | | | |
|---|---|---|---|---|
| 4,864,483 | A * | 9/1989 | Divan ................. | H02M 5/4585 363/132 |
| 5,968,398 | A * | 10/1999 | Schmitt ................. | H05B 6/062 219/620 |
| 6,850,019 | B2 * | 2/2005 | Gerfast ................. | H02P 6/085 310/156.01 |
| 8,406,025 | B1 * | 3/2013 | Alexander .......... | H02M 5/4585 363/132 |

FOREIGN PATENT DOCUMENTS

JP       2001086784       3/2001

* cited by examiner

*Primary Examiner* — Antony M Paul
(74) *Attorney, Agent, or Firm* — Muncy, Geissler, Olds & Lowe, P.C.

(57) ABSTRACT

A power conversion circuit for supplying power to an inductive load, includes a switching circuit and an energy saving circuit. The inductive load is supplied with electrical power and the energy saving circuit is charged when the switching circuit is conductive, and the inductive load is disconnected from the electrical power supply and the energy stored in the energy saving circuit is discharged to the inductive load when the switching circuit is nonconductive.

14 Claims, 5 Drawing Sheets

POWER CONVERTING CIRCUIT

CROSS REFERENCE TO RELATED APPLICATIONS

This non-provisional patent application claims priority under 35 U.S.C. §119(a) from Patent Application No. 201310625830.9 filed in The People's Republic of China on 28 Nov. 2013, the entire contents of which are hereby incorporated by reference.

FIELD OF THE INVENTION

This invention relates to a power conversion circuit for an inductive load and in particular, to a power conversion circuit especially suitable for a BLDC motor.

BACKGROUND OF THE INVENTION

A brushless direct current (BLDC) motor has a magnet rotor and a stator with at least one winding wound thereon. Power can be supplied to the motor by an AC power supply via a power conversion circuit. FIG. 1 illustrates signals of voltage, current and power of an AC power supply, based on a traditional power conversion circuit. At the instant the motor is connected with the AC power supply, current passes through the winding of the stator of the BLDG motor and energy is stored in the magnetic field generated by the winding. As the winding is an inductive element, the phase of the current signal is lagging compared to the phase of the voltage signal. At the instant the motor is connected with the power supply, the rotor of the motor is stationary and no back electromotive force (EMF) is generated by the winding. With an increase in the voltage, the electrified winding increases the strength of a generated magnetic field which interacts with the magnetic field of the rotor to drive the rotor and the winding therefore generates a back EMF VB. According to the traditional power conversion circuit, the winding is charged during the entire period of time the AC voltage is greater than the back EMF VB and the energy stored by the winding is relative high. After the AC voltage decreases to a value smaller than the back EMF VB, the power supplied from the AC power is stopped and the winding starts to discharge energy, which generally lasts until a moment after the AC voltage passes zero, as shown by the shadowed part in FIG. 1, and negative power is therefore generated. The negative power causes part of the power to flow back to the power network and consumes electrical energy, thereby resulting in a decrease in the effective power of the AC power supply.

SUMMARY OF THE INVENTION

Hence there is a desire for a power conversion circuit which reduces the negative power.

Accordingly, in one aspect thereof, the present invention provides a power conversion circuit for supplying power to an inductive load, comprising: a converter for converting an AC voltage to a DC voltage, comprising first and second input terminals for connecting to an AC power supply and first and second DC terminals outputting a DC voltage; a switching circuit comprising first and second controlled terminals and switchable between a conductive state in which the first and second controlled terminals are connected together and a nonconductive state in which the first and second controlled terminals are disconnected, and a control terminal for controlling the switching of the switching circuit between the conductive and nonconductive states; a control circuit providing a control signal to switch the switching circuit between the conductive and nonconductive states; and an energy saving circuit connected to the second controlled terminal and the second DC terminal and comprising first and second output terminals for supplying power to the inductive load, the energy saving circuit storing energy when the switching circuit is conduction and discharging energy to the inductive load when the switching circuit is nonconductive.

Preferably, the control circuit comprises a PWM signal generator.

Preferably, a filtering circuit is connected between the first and second DC terminals.

Preferably, the filtering circuit comprises a first capacitor connected between the first and second DC terminals.

Preferably, the energy saving circuit comprises a diode connected between the second controlled terminal and the second DC terminal and an inductance connected between the second controlled terminal and the first output terminal or between the second DC terminal and the second output terminal.

Preferably, the energy saving circuit further comprises a second capacitor connected between the first and second output terminals.

Preferably, the first and second output terminals are respectively connected to the second controlled terminal and the second DC terminal.

Preferably, the energy saving circuit further comprises an inductance connected between the second controlled terminal and the second DC terminal and a diode connected between the second controlled terminal and the first output terminal or between the second DC terminal and the second output terminal.

According to a second aspect, the present invention provides a power conversion circuit for supplying power to an inductive load, comprising a switching circuit and an energy saving circuit; wherein the inductive load is supplied with an electrical power and the energy saving circuit is charged when the switching circuit is conductive, and the inductive load is disconnected from the electrical power and the energy stored in the energy saving circuit is discharged to the inductive load when the switching circuit is nonconductive.

Preferably, the switching circuit is connected in series with the energy saving circuit.

Preferably, the inductive load includes an electric motor.

Preferably, the inductive load includes a BLDC motor and the power conversion circuit further comprises an inverter connected between the energy saving circuit and the BLDC motor.

Preferably, the inverter is a H-bridge drive circuit.

Preferably, the switching circuit is connected between a DC voltage and the energy saving circuit.

Preferably, the energy saving circuit is connected between the switching circuit and the inductive load.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
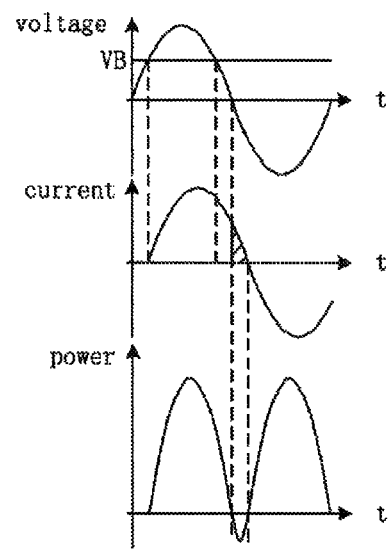
FIG. 1 illustrates signals of voltage, current and power of an AC power supply, based on a traditional power conversion circuit.
Figure 2:
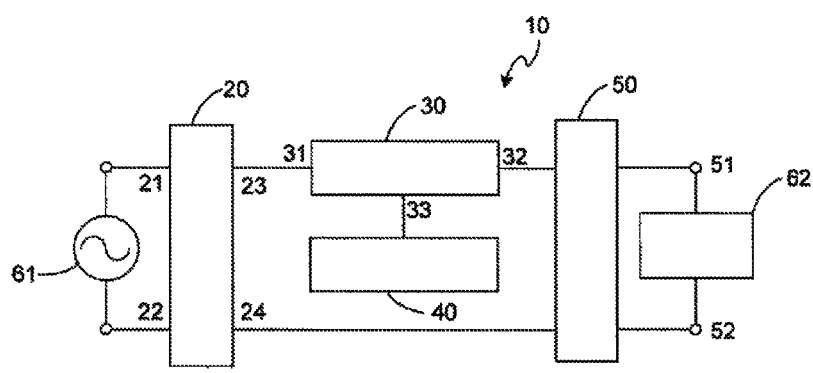
FIG. 2 illustrates a power conversion circuit in accordance with an embodiment of the present invention.

FIG. 2 illustrates a power conversion circuit 10 in accordance with an embodiment of the present application. The power conversion circuit 10 is adapted to supply power to an inductive load 62. In this embodiment, the inductive load 62 is preferably a BLDC motor which is driven by an inverter which is preferably H-bridge driving circuit. The power conversion circuit 10 comprises an AC to DC converter 20, a switching circuit 30, a control circuit 40 and an energy saving circuit 50.

The AC to DC converter 20 convers an AC voltage from an AC power supply 61 to a DC voltage and comprises a first input terminal 21, a second input terminal 22, a first DC terminal 23 and a second DC terminal 24. The first and second input terminals 21 and 22 connect to the AC power supply 61. The first and second DC terminals 23 and 24 output the DC voltage.

The switching circuit 30 comprises a first controlled terminal 31, a second controlled terminal 32, and a control terminal 33 which controls the conduction or disconnection of the first and second controlled terminals 31 and 32. The first controlled terminal 31 is connected to the first DC terminal 23. The control circuit 40 provides a control signal to the control terminal 33 for selectively connecting and disconnecting the first controlled terminal 31 with/from and second controlled terminal 32. The switching circuit is said to be conductive when the first and second controlled terminals are connected together.

The energy saving circuit 50 is connected to the second controlled terminal 32 and the second DC terminal 24 and comprises a first output terminal 51 and a second output terminal 52 which are connected to the inductive load 62 preferably via the inverter not shown in FIG. 2. The energy saving circuit 50 stores energy when the switching circuit 30 is conductive and discharges energy to the inductive load 62 when the switching circuit 30 is nonconductive so as to maintain the operation of the BLDC motor.

Figure 3:
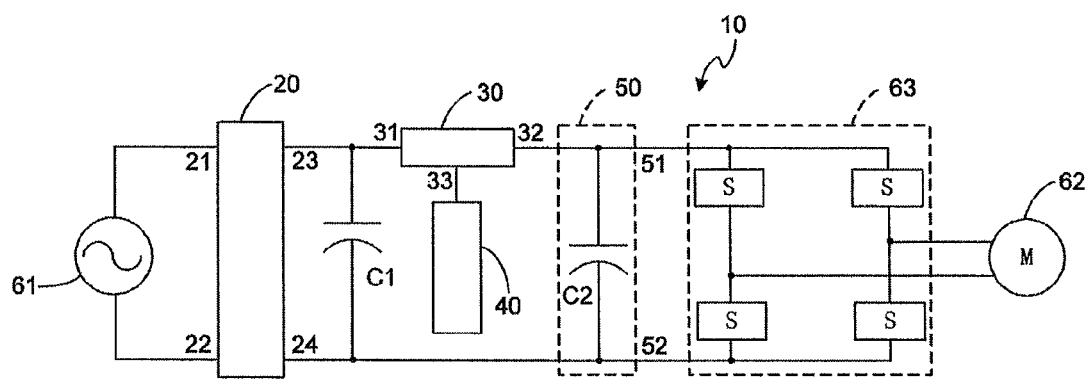
FIG. 3 illustrates a power conversion circuit in accordance with another embodiment of the present invention.

FIG. 3 illustrates a power conversion circuit in accordance with another embodiment of the present invention. In this embodiment, the AC to DC converter 20 is preferably a half-bridge diode rectifier. The switching circuit 30 preferably includes a bipolar junction transistor (BJT) or a metal-oxide-semiconductor field effect transistor (MOSFET). The collector and the emitter of the BJT or the drain and the source of the MOSFET are the first and second controlled terminals 31 and 32 and the base of the BJT or the gate of the MOSFET is the control terminal 33. The first controlled terminal 31 is connected to the first DC terminal 23. The control circuit 40 preferably includes a PWM signal generator or another type of signal generator such as single chip microprocessor.

The energy saving circuit 50 comprises a second capacitor C2 connected between the second controlled terminal 32 which is directly connected to the first output terminal 51 and the second DC terminal 24 which is directly connected to the second output terminal 52. The switches in the H-bridge driving circuit 63 can be controlled by a controller to operate the motor normally. Preferably, the controller is incorporated into the control circuit 40.

Figure 4:
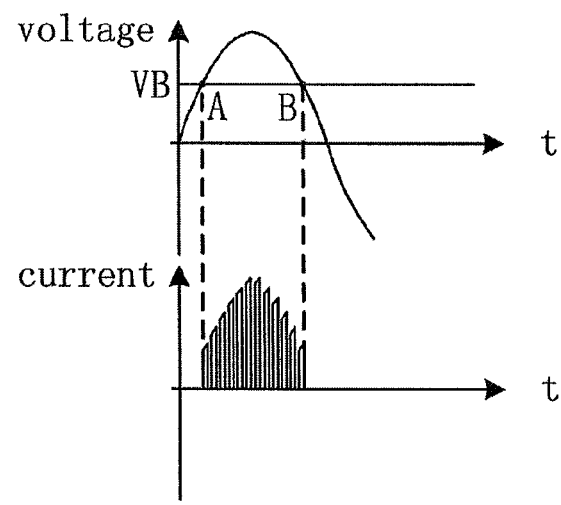
FIG. 4 illustrates signals of voltage and current of an AC power supply, based on the power conversion circuit in FIG. 3.

Referring to FIG. 4, during operation, the converting circuit 20 coverts the AC voltage to a DC voltage which is applied to the first and second DC terminals 23 and 24. The switching circuit 30 is selectively conductive and nonconductive under the control of the control circuit 40. When the switching circuit 30 is conductive, the DC voltage is supplied to the BLDC motor and the BLDC motor starts to rotate and a back EMF VB is generated by the motor windings. When the voltage of the AC power supply 61 increases to a value greater than the back EMF VB (at point A in the Figure) current is provided by the AC power supply 61. Before point A no current passes from the AC power supply 61.

The switching circuit 30 is conductive or nonconductive under the control of the control circuit 40. The AC power supply 61 supplies power to the inductive load 62 during the period between point A and point B in which the voltage of the AC power supply 61 is greater than the back EMF VB. When the switching circuit 30 is conductive, the AC power supply 61 forms a first circuit with the AC to DC converter 20, the switching circuit 30, the H-bridge driving circuit 63 and the BLDC motor 62. Meantime, the AC power supply 61 forms a second circuit with the AC to DC converter 20, the switching circuit 30 and the energy saving circuit 50 and energy is therefore stored in the energy saving circuit 50. When the switching circuit 30 is nonconductive, no current is provided by the AC power supply 61 as it is impossible to form above described first or second circuit. During this period the energy saving circuit 50 discharges energy to the H-bridge driving circuit 63 and the BLDC motor 62 so as to maintain the operation of the motor. Thus, the AC power supply 61 provides a series of current pulse and no current shift is generated after the AC voltage passes zero.

When the AC voltage decreases to a value equal to the back EMF VB (at point B in the Figure), even decreases to zero, if there is energy stored in the winding of the motor, that is, voltage exists at the inductive load 62, the energy saved in the motor flows back to the AC power supply 61 via the H-bridge driving circuit 63 and the switching circuit 30 when the switching circuit 30 is conductive. The discharging period corresponds to the switching frequency and the conduction time of the switching circuit 30 which corresponds to the duty cycle of the control signal of the control circuit 40. As the switching circuit 30 is alternately conductive and nonconductive, the period of time charging the winding of the motor is reduced and the energy stored in the winding is therefore reduced and the discharge of the winding can be finished quickly. Thus, the current shift can be reduced and negative power is reduced, which improves the effective output of the motor and decreases the electrical consumption of the power network, and the electrical efficiency is therefore increased. In this embodiment, the higher the switching frequency of the switching circuit 30 and or the smaller the duty cycle of the control signal is, the smaller the negative power.

Preferably, a filtering circuit is connected between the first and second DC terminals 23 and 24 for filtering the DC voltage output from the first and second DC terminals 23 and 24. In this embodiment, the filtering circuit includes a first capacitor C1. It should be understood that the filtering circuit could alternatively include a LC circuit where the inductance of the LC circuit is connected between the AC to DC converter 20 and the first capacitor C1, or could include only an inductance.

During the period of time between point A and point B, the rotating speed of the motor can be controlled by adjusting the conductive time of the switching circuit 30 which corresponds to the duty cycle of the control signal of the control circuit 40. The higher the duty cycle is, which means the switching circuit 30 has longer conduction time, the more energy is saved in the winding of the BLDC motor, and the larger the negative power.

It should be understood that alternatively the switching circuit 30 can be connected between the second DC terminal 24 and the energy saving circuit 50.

Figure 5:
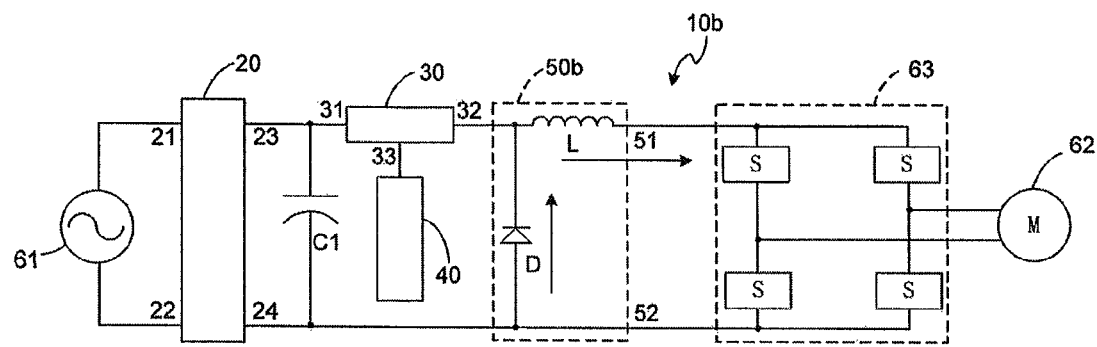
FIG. 5 illustrates a power conversion circuit in accordance with another embodiment of the present invention

FIG. 5 illustrates the power conversion circuit 10b in accordance with another embodiment of the present invention. The power conversion circuit 10b is similar to the power conversion circuit 10 in the above embodiment. The difference between them is that the energy saving circuit 50b of the power conversion circuit 10b comprises a diode D and an inductance L. The anode of the diode D is connected to the second DC terminal 24 and the cathode of the diode D is connected to the second controlled terminal 32. The inductance L is connected between the second controlled terminal 32 and the first output terminal 51. The second output terminal 52 is directly connected to the second DC terminal 24.

Figure 6:
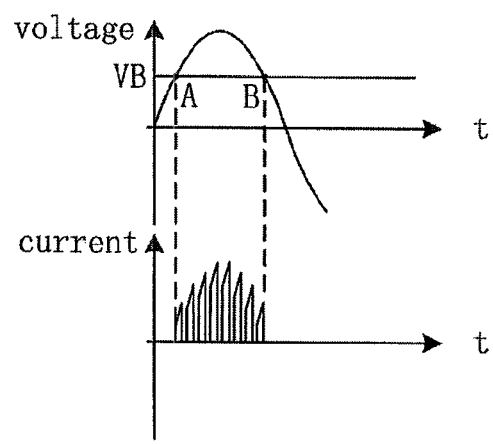
FIG. 6 illustrates signals of voltage and current of an AC power supply, based on the power conversion circuit in FIG. 5.

Referring to FIG. 6, during operation, a voltage is applied to the BLDC motor 62, the BLDC motor rotates and back EMF VB is generated by the winding. When the AC voltage increases to a value greater than the back EMF VB (at point A in the Figure), current is provided by the AC power supply 61. During the period between point A and point B, in which the voltage of the AC power supply 61 is greater than the back EMF VB, when the switching circuit 30 is conductive, the AC power supply 61 forms a circuit with the AC to DC converter 20, the switching circuit 30, the inductance L of the energy saving circuit 50b, the H-bridge driving circuit 63 and the BLDC motor 62 and the energy is stored in the inductance L. When the switching circuit 30 is nonconductive, no current is provided by the AC power supply 61 as it is impossible to form the above mentioned charging circuit. During this period the energy saving circuit 50b forms a discharging circuit via the diode D to discharge energy to the H-bridge driving circuit 63 and the BLDC motor 62 so as to maintain the operation of the motor. Thus, the AC power supply 61 provides a series of current pulse, as shown in FIG. 6.

When the AC voltage decreases to a value equal to the back EMF VB (at point B in the Figure), the energy saved in the winding of the motor flows back to the AC power supply 61 via the H-bridge driving circuit and the switching circuit 30 when the switching circuit 30 is conductive. As the switching circuit 30 is alternately conductive and nonconductive, the period of time charging the winding of the motor is reduced and the energy stored in the winding is therefore reduced and the discharge of the winding can be finished quickly. Thus, the negative power is reduced, which improves the effective output of the motor and decreases the electrical consumption of the power network, and the electrical efficiency is therefore increased. Further, the inductance L can reduce current harmonics and electro-magnetic interference.

It should be understood that alternatively the inductance L may be connected between the second DC terminal 24 and the second output terminal 52 and the switching circuit 30 may be alternatively connected between the second DC terminal 24 and the energy saving circuit 50b.

Figure 7:
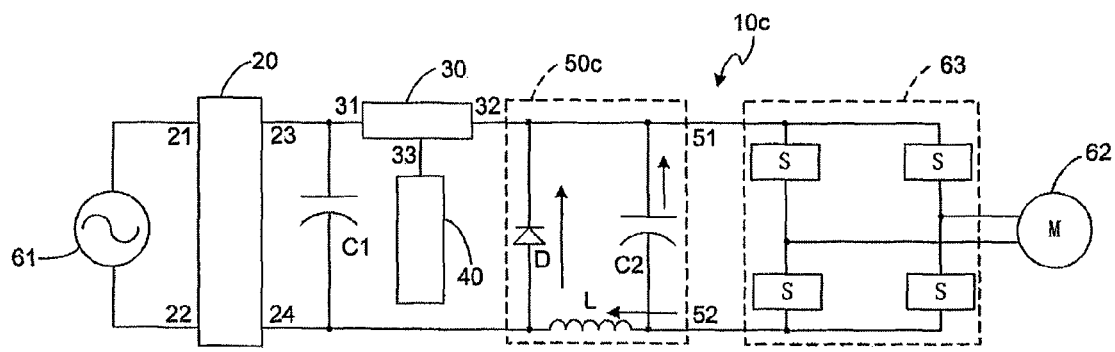
FIG. 7 illustrates a power conversion circuit in accordance with another embodiment of the present invention.

FIG. 7 illustrates the power conversion circuit 10c in accordance with another embodiment of the present invention. The power conversion circuit 10c is similar to the power conversion circuit 10. The difference between them is that the energy saving circuit 50c of the power conversion circuit 10c comprises a diode D, an inductance L and a second capacitor C2. The anode of the diode D is connected to the second DC terminal 24 and the cathode of the diode D is connected to the second controlled terminal 32. The inductance L is connected between the second DC terminal 24 and the second output terminal 52. The anode of the second capacitor C2 is connected to the first output terminal 51 and the cathode of the second capacitor C2 is connected to the second output terminal 52. The first output terminal 51 is directly connected to the second controlled terminal 32.

Figure 8:
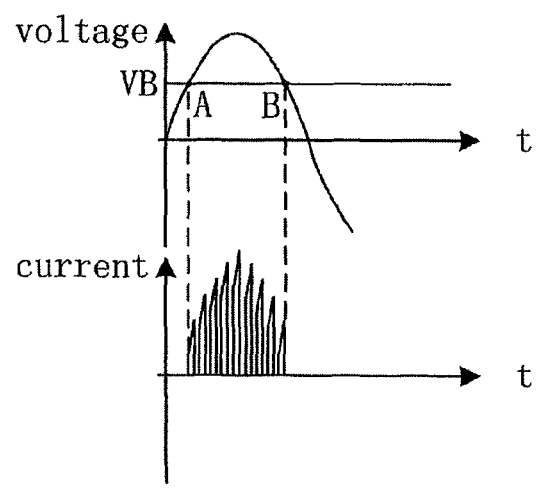
FIG. 8 illustrates signals of voltage and current of an AC power supply, based on the power conversion circuit in FIG. 7.

Referring to FIG. 8, during operation, a voltage is applied to the BLDC motor, the BLDC motor rotates and back EMF VB is generated by the windings. When the voltage of the AC power 61 increases to a value greater than the back EMF VB (at point A in the Figure), current is provided by the AC power supply 61. During the period between point A and point B, in which the voltage of the AC power supply 61 is greater than the back EMF VB, when the switching circuit 30 is conductive, the AC power supply 61 forms a first circuit with the AC to DC converter 20, the switching circuit 30, the inductance L of the energy saving circuit 50b, the H-bridge driving circuit 63 and the BLDC motor 62 and forms a second circuit with the AC to DC converter 20, the switching circuit 30, the inductance L and the second capacitor C2 of the energy saving circuit 50c and energy is therefore stored in the inductance L and the second capacitor C2. When the switching circuit 30 is nonconductive, no current is provided by the AC power supply 61 as it is impossible to form the above mentioned first and second circuits. During this period the inductance L2 forms a discharge circuit via the diode D to discharge energy to the H-bridge driving circuit and the BLDC motor. Meantime the second capacitor C2 discharges energy to the H-bridge driving circuit and the BLDC motor. The operation of the motor is therefore maintained. Thus, the AC power supply 61 provides a series of current pulse, as shown in FIG. 8.

When the AC voltage decreases to a value equal to the back EMF VB (at point B in the Figure), the energy saved in the winding of the motor flows back to the AC power supply 61 via the H-bridge driving circuit 63 and the switching circuit 30 when the switching circuit 30 is conductive. As the switching circuit 30 is alternately conductive and nonconductive, the period of time charging the winding of the motor is reduced, the energy stored in the winding is therefore reduced and the discharge of the winding can be finished quickly. Thus, the negative power is reduced, which improves the effective output of the motor and decreases the electrical consumption of the power network, and the electrical efficiency is therefore increased. Further, the inductance L and the second capacitor C2 can reduce current harmonics and electro-magnetic interference, stabilize the voltage supplied to the BLDC motor and therefore stabilize the speed of the motor.

It should be understood that alternatively the inductance L may be connected between the second controlled terminal 32 and the first output terminal 51 and the switching circuit 30 may be alternatively connected between the second DC terminal 24 and the energy saving circuit 50c.

Figure 9:
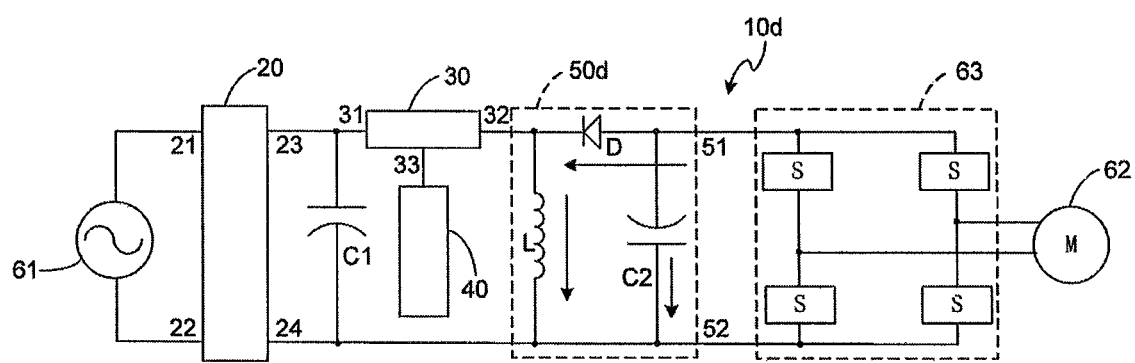
FIG. 9 illustrates a power conversion circuit in accordance with another embodiment of the present invention.

FIG. 9 illustrates the power conversion circuit 10d in accordance with another embodiment of the present invention. The power conversion circuit 10d is similar to the power conversion circuit 10c. The difference between them is that in the energy saving circuit 50d of the power conversion circuit 10d, the inductance L is connected between the second controlled terminal 32 and the second DC terminal 24, the anode of the diode D is connected to the first output terminal 51 and the cathode of the diode D is connected to the second controlled terminal 32, and the anode of the second capacitor C2 of the energy saving circuit 50d is connected to the second output terminal 52 and the cathode of the second capacitor C2 is connected to the first output terminal 51.

Referring to FIG. 8 again, during operation, a voltage is applied to the BLDC motor, the BLDC motor rotates and the back EMF VB is generated by the winding. When the voltage of the AC power 61 increases to a value greater than the back EMF VB (at point A in the Figure), current is provided by the AC power supply 61. Before point A, no current passes from the AC power supply 61. During the period between point A and point B, in which the voltage of the AC power supply 61 is greater than the back EMF VB, when the switching circuit 30 is conductive, the AC power supply 61 forms a circuit with the AC to DC converter 20, the switching circuit 30, the inductance L of the energy saving circuit 50d to charge the inductance L. When the switching circuit 30 is nonconductive, the inductance L forms a circuit with the second capacitor C2 and the diode D to discharge. After being fully charged, the second capacitor C2 provides a negative voltage to the H-bridge driving circuit. When the switching circuit 30 is conductive again, the AC power supply 61 charges the inductance L and the second capacitor C2 forms a discharging circuit with the H-bridge driving circuit and the BLDC motor to maintain the operation of the motor. When the switching circuit 30 is nonconductive again, similar to the description above, the inductance L discharges energy via the second capacitor C2 and the diode and the second capacitor C2 provides the negative voltage after being fully charged.

Compared with the energy saving circuit 50c, the energy saving circuit 50d in this embodiment changes the polarity of the voltage output by the first and second output terminals 51 and 52 by changing the position and polarity of its elements so that the power conversion circuit 50d is suitable for the motor requiring voltage with reversed polarity.

Similarly, as the switching circuit 30 is alternately conductive and nonconductive, the period of time charging the winding of the motor is reduced, the energy stored in the winding is therefore reduced and the discharge of the winding can be finished quickly. Thus, the negative power is reduced, which improves the effective output of the motor and decreases the electrical consumption of the power network, and therefore the electrical efficiency is increased.

It should be understood that alternatively the diode D may be connected between the second output terminal 52 and the second DC terminal 24 with the anode of the diode D connected to the second DC terminal 24 and the cathode of the diode D connected to the second output terminal 52. Further, alternatively the switching circuit 30 may be connected between the second DC terminal 24 and the energy saving circuit 50d.

In the description and claims of the present application, each of the verbs "comprise", "include", "contain" and "have", and variations thereof, are used in an inclusive sense, to specify the presence of the stated item but not to exclude the presence of additional items.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to one or more preferred embodiments, it should be appreciated by those skilled in the art that various modifications are possible. Therefore, the scope of the invention is to be determined by reference to the claims that follow.

The invention claimed is:

1. A power conversion circuit for supplying power to an inductive load, comprising:
    a converter for converting an AC voltage to a DC voltage, comprising first and second input terminals for connecting to an AC power supply and first and second DC terminals outputting a DC voltage;
    a switching circuit comprising first and second controlled terminals and switchable between a conductive state in which the first and second controlled terminals are connected together and a nonconductive state in which the first and second controlled terminals are disconnected, and a control terminal for controlling the switching of the switching circuit between the conductive and nonconductive states;
    a control circuit providing a control signal to switch the switching circuit between the conductive and nonconductive states; and
    an energy saving circuit connected to the second controlled terminal and the second DC terminal and comprising first and second output terminals for supplying power to the inductive load, the energy saving circuit storing energy when the switching circuit is conduction and discharging energy to the inductive load when the switching circuit is nonconductive.

2. The power conversion circuit of claim 1, wherein the control circuit comprises a PWM signal generator.

3. The power conversion circuit of claim 1, further comprises a filtering circuit connected between the first and second DC terminals.

4. The power conversion circuit of claim 3, wherein the filtering circuit comprises a first capacitor connected between the first and second DC terminals.

5. The power conversion circuit of claim 1, wherein the energy saving circuit comprises a diode connected between the second controlled terminal and the second DC terminal and an inductance connected between the second controlled terminal and the first output terminal or between the second DC terminal and the second output terminal.

6. The power conversion circuit of claim 5, wherein the energy saving circuit further comprises a second capacitor connected between the first and second output terminals.

7. The power conversion circuit of claim 1, wherein the first and second output terminals are respectively connected to the second controlled terminal and the second DC terminal.

8. The power conversion circuit of claim 7, wherein the energy saving circuit further comprises an inductance connected between the second controlled terminal and the second DC terminal and a diode connected between the second controlled terminal and the first output terminal or between the second DC terminal and the second output terminal.

9. A power conversion circuit for supplying power to an inductive load, comprising a switching circuit and an energy saving circuit;
  wherein the inductive load is supplied with an electrical power and the energy saving circuit is charged when the switching circuit is conductive, and the energy stored in the energy saving circuit is discharged to the inductive load when the switching circuit is nonconductive, and
  wherein the switching circuit is connected in series with the energy saving circuit.

10. The power conversion circuit of claim 9, wherein the inductive load includes an electric motor.

11. The power conversion circuit of claim 9, wherein the inductive load includes a BLDC motor and the power conversion circuit further comprises an inverter connected between the energy saving circuit and the BLDC motor.

12. The power conversion circuit of claim 11, wherein the inverter is a H-bridge drive circuit.

13. The power conversion circuit of claim 9, wherein the switching circuit is connected between a DC voltage and the energy saving circuit.

14. The power conversion circuit of claim 9, wherein the energy saving circuit is connected between the switching circuit and the inductive load.

* * * * *